United States Patent
King et al.

(10) Patent No.: US 10,443,447 B2
(45) Date of Patent: Oct. 15, 2019

(54) DOUBLER ATTACHMENT SYSTEM

(71) Applicant: General Electric Company, Schenectady, NY (US)

(72) Inventors: Daniel Elmer King, Norwood, OH (US); Jonathan Harry Kerner, Brookline, MA (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 15/068,682

(22) Filed: Mar. 14, 2016

(65) Prior Publication Data

US 2017/0260877 A1   Sep. 14, 2017

(51) Int. Cl.
| F01D 25/24 | (2006.01) |
| F02C 7/20  | (2006.01) |
| F01D 25/16 | (2006.01) |
| F01D 9/04  | (2006.01) |

(52) U.S. Cl.
CPC ......... *F01D 25/243* (2013.01); *F01D 25/162* (2013.01); *F02C 7/20* (2013.01); *F01D 9/042* (2013.01); *F01D 25/246* (2013.01); *F05D 2220/32* (2013.01); *Y02T 50/672* (2013.01)

(58) Field of Classification Search
CPC .............................................. F05D 2240/125
See application file for complete search history.

(56) References Cited

U.S. PATENT DOCUMENTS

| 2,363,600 A | 11/1944 | Lawlor |
| 2,483,097 A | 9/1949 | McIlwain |
| 2,720,370 A | 10/1955 | Hasbrouck |
| 2,944,172 A | 7/1960 | Opitz et al. |
| 3,143,732 A | 8/1964 | Leighton et al. |
| 3,992,627 A | 11/1976 | Stewart |
| 4,040,249 A | 8/1977 | Kahle et al. |

(Continued)

FOREIGN PATENT DOCUMENTS

| EP | 0099433 A1 | 2/1984 |
| EP | 0155320 A1 | 9/1985 |

(Continued)

OTHER PUBLICATIONS

"Doubler—definition of doubler by The Free Dictionary," Retrieved from the Internet URL: http://www.thefreedictionary.com/doubler, on Aug. 16, 2017, pp. 1-2.

(Continued)

*Primary Examiner* — Justin D Seabe
*Assistant Examiner* — Juan G Flores
(74) *Attorney, Agent, or Firm* — Dority & Manning, P.A.

(57) ABSTRACT

A doubler attachment system is provided for fixedly coupling a strut to an engine casing. The strut includes at least one flanged end configured to mate with the engine casing. The doubler attachment system includes a doubler plate having a first radial surface and a second opposing radial surface. The first radial surface is configured to mate with and conform to a contour of the at least one flanged end of the strut. The doubler attachment system further includes at least two bolts fixedly attached to the doubler plate at the first radial surface. The at least two bolts extend radially away from the first radial surface and toward the engine casing.

18 Claims, 5 Drawing Sheets

(56) References Cited

U.S. PATENT DOCUMENTS

| | | | |
|---|---|---|---|
| 4,177,638 A | 12/1979 | Wood | |
| 4,544,929 A | 10/1985 | Lemelson | |
| 4,649,950 A | 3/1987 | Bradley et al. | |
| 4,663,932 A | 5/1987 | Cox | |
| 5,080,648 A | 1/1992 | D'Antonio | |
| 5,180,282 A | 1/1993 | Lenhart et al. | |
| 5,272,869 A | 2/1993 | Dawson et al. | |
| 5,220,785 A | 6/1993 | Miller | |
| 5,222,360 A | 6/1993 | Antuna et al. | |
| 5,223,651 A | 6/1993 | Stickler et al. | |
| 5,426,476 A | 6/1995 | Fussell et al. | |
| 5,451,134 A | 9/1995 | Bryfogle | |
| 5,685,797 A | 11/1997 | Barnsby et al. | |
| 5,824,423 A | 10/1998 | Maxwell et al. | |
| 6,056,716 A | 5/2000 | D'Antonio et al. | |
| 6,142,419 A | 11/2000 | Arlton | |
| 6,159,348 A | 12/2000 | Barnsby et al. | |
| 6,969,826 B2 | 11/2005 | Trewiler et al. | |
| 7,100,358 B2 | 9/2006 | Gekht et al. | |
| 7,509,735 B2 | 3/2009 | Philip et al. | |
| 7,654,075 B2 | 2/2010 | Udall | |
| 8,054,939 B2 | 11/2011 | Gordon, III et al. | |
| 8,289,274 B2 | 10/2012 | Sliwa et al. | |
| 8,420,356 B2 | 4/2013 | Medoff et al. | |
| 8,691,526 B2 | 4/2014 | Medoff et al. | |
| 8,716,009 B2 | 5/2014 | Medoff et al. | |
| 8,881,397 B1 | 11/2014 | Dowd | |
| 9,011,087 B2 | 4/2015 | Mironets et al. | |
| 9,347,327 B2 * | 5/2016 | Armstrong | F01D 9/00 |
| 9,777,585 B2 * | 10/2017 | Drane | F04D 29/023 |
| 2003/0183306 A1 | 10/2003 | Hehmann et al. | |
| 2005/0224487 A1 | 10/2005 | Trewiler et al. | |
| 2006/0010852 A1 | 1/2006 | Gekht et al. | |
| 2006/0260127 A1 | 11/2006 | Gekht et al. | |
| 2007/0084218 A1 | 4/2007 | Udall | |
| 2007/0207328 A1 | 9/2007 | Frost et al. | |
| 2008/0237403 A1 | 10/2008 | Kelly et al. | |
| 2009/0123279 A1 | 5/2009 | Drelon et al. | |
| 2010/0210745 A1 | 8/2010 | McDaniel et al. | |
| 2010/0233146 A1 | 9/2010 | McDaniel | |
| 2010/0271550 A1 | 10/2010 | Jardee et al. | |
| 2010/0321478 A1 | 12/2010 | Sliwa et al. | |
| 2011/0026675 A1 | 2/2011 | Gordon, III et al. | |
| 2011/0079427 A1 | 4/2011 | Powale et al. | |
| 2011/0177558 A1 | 7/2011 | Medoff et al. | |
| 2011/0177559 A1 | 7/2011 | Medoff et al. | |
| 2011/0240064 A1 | 10/2011 | Wales et al. | |
| 2011/0262277 A1 | 10/2011 | Sjoeqvist et al. | |
| 2012/0034471 A1 | 2/2012 | Peterson | |
| 2012/0097194 A1 | 4/2012 | McDaniel et al. | |
| 2012/0156020 A1 | 6/2012 | Kottilingam et al. | |
| 2013/0149130 A1 * | 6/2013 | Hasting | F01D 9/042 415/208.1 |
| 2013/0183748 A1 | 7/2013 | Medoff et al. | |
| 2013/0224008 A1 | 8/2013 | Cheung et al. | |
| 2013/0251536 A1 | 9/2013 | Mironets et al. | |
| 2013/0287562 A1 | 10/2013 | Ishigure et al. | |
| 2013/0336794 A1 * | 12/2013 | Armstrong | F01D 9/00 416/189 |
| 2014/0064956 A1 * | 3/2014 | Drane | F04D 29/023 415/209.3 |
| 2014/0169956 A1 | 6/2014 | Lyders | |
| 2014/0206043 A1 | 7/2014 | Medoff et al. | |
| 2014/0206044 A1 | 7/2014 | Medoff et al. | |
| 2015/0052872 A1 | 2/2015 | Zurmehly et al. | |
| 2015/0056006 A1 | 2/2015 | Bernath et al. | |
| 2015/0192072 A1 | 7/2015 | Hagan | |
| 2015/0233293 A1 | 8/2015 | Grogg | |
| 2016/0245308 A1 * | 8/2016 | Robertson | F01D 9/042 |
| 2017/0051617 A1 * | 2/2017 | Guilbert | F01D 9/041 |

FOREIGN PATENT DOCUMENTS

| | | |
|---|---|---|
| EP | 0516389 A2 | 12/1992 |
| EP | 0316428 B1 | 4/1993 |
| EP | 0576806 A1 | 1/1994 |
| EP | 0743472 A2 | 11/1996 |
| EP | 0760727 A1 | 3/1997 |
| EP | 0772698 A1 | 5/1997 |
| EP | 0516389 B1 | 8/1997 |
| EP | 0886685 A2 | 12/1998 |
| EP | 0995817 A1 | 4/2000 |
| EP | 1009457 A2 | 6/2000 |
| EP | 0886685 B1 | 5/2001 |
| EP | 1584402 A2 | 10/2005 |
| EP | 1584402 A3 | 6/2006 |
| EP | 1775428 A2 | 4/2007 |
| EP | 0995817 B1 | 5/2007 |
| EP | 1781900 A1 | 5/2007 |
| EP | 1829984 A1 | 9/2007 |
| EP | 1993977 A1 | 11/2008 |
| EP | 1584402 B1 | 5/2010 |
| EP | 2324087 A2 | 5/2011 |
| EP | 2379845 A1 | 10/2011 |
| EP | 2466070 A2 | 6/2012 |
| EP | 2526181 A1 | 11/2012 |
| EP | 2526182 A1 | 11/2012 |
| EP | 1775428 B1 | 2/2013 |
| EP | 1781900 B1 | 6/2014 |
| EP | 2 788 587 A1 | 10/2014 |
| EP | 2831377 A2 | 2/2015 |
| WO | 8500853 A1 | 2/1985 |
| WO | 9532074 A2 | 11/1995 |
| WO | 9604409 A1 | 2/1996 |
| WO | 9729219 A2 | 8/1997 |
| WO | 9817332 A2 | 4/1998 |
| WO | 2006007686 A1 | 1/2006 |
| WO | 2008048567 A2 | 4/2008 |
| WO | 2008082427 A1 | 7/2008 |
| WO | 2009155115 A2 | 12/2009 |
| WO | 2010071496 A1 | 6/2010 |
| WO | 2011090543 A1 | 7/2011 |
| WO | 2011090544 A1 | 7/2011 |
| WO | 2014011242 A2 | 1/2014 |
| WO | 2014105108 A1 | 7/2014 |
| WO | 2014105109 A1 | 7/2014 |
| WO | 2014105113 A1 | 7/2014 |
| WO | 2014150301 A1 | 9/2014 |
| WO | 2014150335 A1 | 9/2014 |
| WO | 2015006026 A1 | 1/2015 |
| WO | 2015006056 A1 | 1/2015 |
| WO | 2015009448 A1 | 1/2015 |
| WO | 2015047495 A2 | 4/2015 |
| WO | 2015058043 A1 | 4/2015 |
| WO | 2015073852 A1 | 5/2015 |
| WO | 2015073938 A1 | 5/2015 |
| WO | 2015076909 A2 | 5/2015 |
| WO | 2015094531 A1 | 6/2015 |
| WO | 2015112225 A2 | 7/2015 |
| WO | 2015123006 A1 | 8/2015 |

OTHER PUBLICATIONS

"Whatis.Com," doubler, Retrieved from the Internet URL: http://whatis.techtarget.com/detinitiondoublervgnextfmt=print, on Aug. 16, 2017, p. 1-1.

Extended European Search Report and Opinion issued in connection with corresponding EP Application No. 17155018.9 dated Aug. 31, 2017.

* cited by examiner

DOUBLER ATTACHMENT SYSTEM

STATEMENT REGARDING FEDERALLY SPONSORED RESEARCH & DEVELOPMENT

This invention was made with government support under contract number DTWAFA-10-C-00046 awarded by the Federal Aviation Administration (FAA). The U.S. government may have certain rights in this invention.

BACKGROUND

The field of the disclosure relates generally to gas turbine engines and, more particularly, to an attachment system for coupling components.

Military purpose gas turbine engines are known to include a front frame assembly, an upstream end of which forms an inlet flowpath. The inlet flowpath is sized to provide a predetermined airflow to a fan assembly disposed directly downstream of the front frame assembly. The fan assembly typically includes a plurality of fan blades that rotate at high speed behind the front frame assembly during engine operation. Downstream of the fan assembly is typically a core engine for combusting fuel mixed with pressurized air to produce combustion gases that produce a propulsive force for the engine when discharged.

The high speed rotation of the fan assembly directly behind the front frame assembly places significant load stresses between the inner and outer casings of the front frame assembly. The loss of a fan blade during operation of the engine, sometimes referred to as a "blade out" condition, can place a considerably greater load stress on the fan frame assembly. This load stress can increase for larger engines utilizing larger fan assemblies. Some known front frame assemblies utilize a greater quantity of struts to connect the inner and outer casings, however, additional struts impede airflow into the fan assembly, and also add weight to the engine, which reduces engine efficiency. Other known front frame assemblies add additional bolts or welded joints within the inlet flowpath to more securely attach the struts to the inner and outer casings, however, these additional attachments within the flowpath also impede airflow into the fan assembly.

BRIEF DESCRIPTION

In one aspect, a doubler attachment system is provided for fixedly coupling a strut to an engine casing. The strut includes at least one flanged end configured to mate with the engine casing. The doubler attachment system includes a doubler plate having a first radial surface and a second opposing radial surface. The first radial surface is configured to mate with and conform to a contour of at least one flanged end of the strut. The doubler attachment system further includes at least two bolts fixedly attached to the doubler plate at the first radial surface. The at least two bolts extend radially away from the first radial surface.

In another aspect, a front frame assembly for a gas turbine engine includes a generally cylindrical outer casing and a hub ring disposed coaxially within the generally cylindrical outer casing. The cylindrical outer casing has an inner casing surface radially facing an air flowpath through the gas turbine engine, and the hub ring has an outer hub surface radially opposed to the inner casing surface. The front frame assembly further includes a plurality of strut assemblies circumferentially disposed about the hub ring, and configured to fixedly couple the outer hub surface with the inner casing surface. Each of the plurality of strut assemblies includes an airfoil portion oriented in the axial direction of the air flowpath and includes first and second opposing airfoil ends, and an outer T-flange disposed at the first opposing airfoil end. The outer T-flange includes two opposing outer flanges extending away from the airfoil portion and is configured to couple with the inner casing surface. Each strut assembly further includes an outer doubler assembly pair configured to fixedly secure the two opposing outer flanges, respectively, to the inner casing surface. Each outer doubler assembly includes an outer doubler plate and at least two bolts fixedly attached at a first surface of the outer doubler plate.

In yet another aspect, a gas turbine engine is provided. The gas turbine engine includes a core engine and a fan assembly having a forward fan shaft bearing disposed upstream of the core engine. The gas turbine engine includes a front frame assembly disposed upstream of the fan assembly. The front frame assembly includes a generally cylindrical outer casing disposed coaxially with the forward fan shaft bearing, a hub ring disposed about the forward fan shaft bearing and coaxially within the cylindrical outer casing, and a plurality of struts circumferentially disposed about the hub ring and configured to fixedly couple the cylindrical outer casing with the hub ring. Each strut of the plurality of struts includes an outer T-flange configured to mate with the cylindrical outer casing and an inner T-flange configured to mate with the hub ring. Each strut further includes a plurality of doubler assemblies configured to fixedly secure each flanged portion of the outer and inner T-flanges to the cylindrical outer casing and the hub ring, respectively. Each doubler assembly includes a doubler plate having a first radial surface and a second opposing radial surface, and at least two bolts fixedly attached at the first radial surface and extending in the radial direction.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
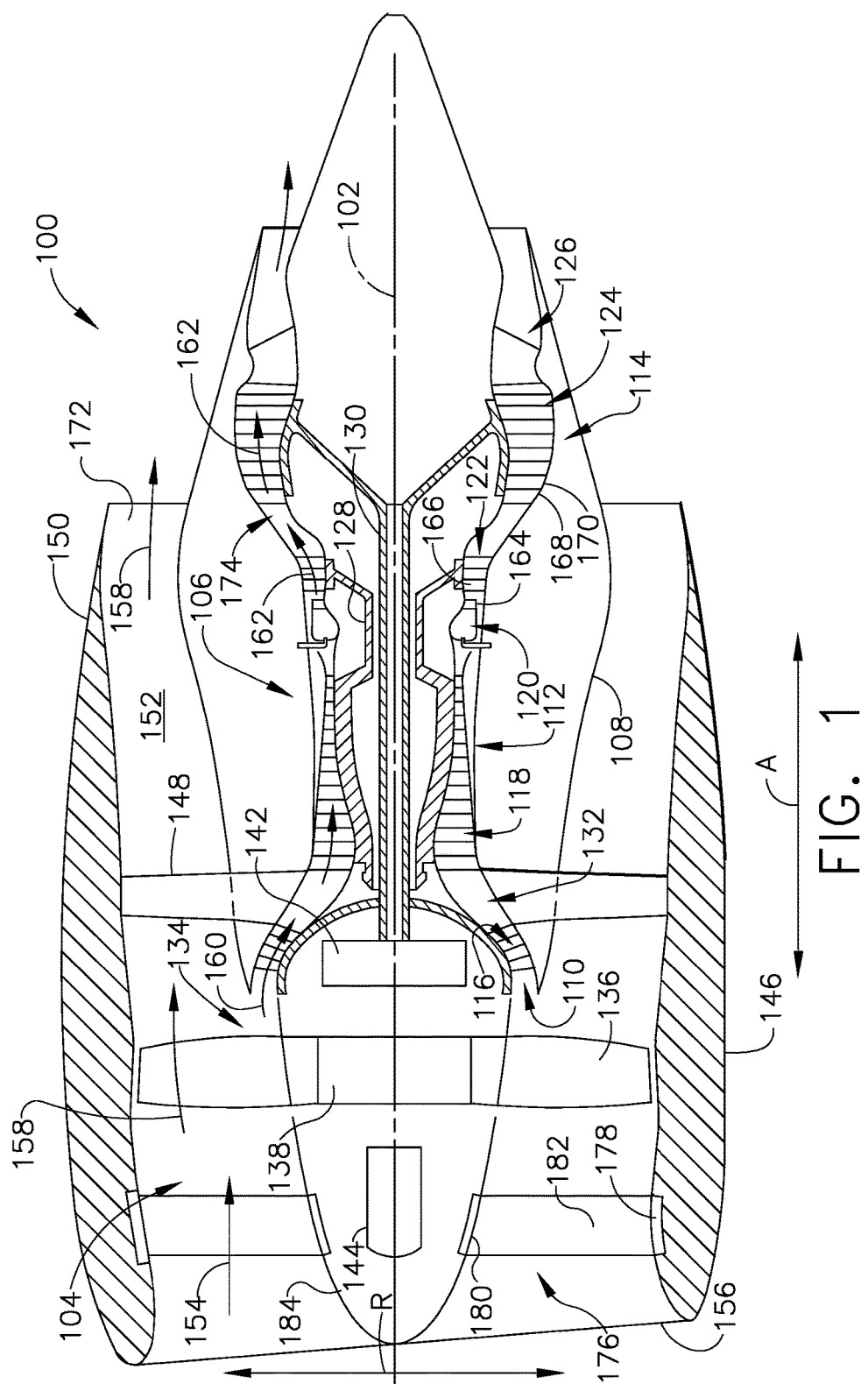
FIG. 1 is a schematic illustration of an exemplary gas turbine engine.

FIG. 1 is a schematic cross-sectional view of a gas turbine engine 100 in accordance with an exemplary embodiment of the present disclosure. In the exemplary embodiment, gas turbine engine 100 is embodied in a high-bypass turbofan jet engine. In other embodiments, gas turbine engine 100 is embodied in a military purpose jet engine. As shown in FIG. 1, gas turbine engine 100 defines an axial direction A (extending parallel to a longitudinal axis 102 provided for reference) and a radial direction R. In general, gas turbine engine 100 includes a fan section 104 and a core engine 106 disposed downstream from fan section 104.

In the exemplary embodiment, core engine 106 includes an approximately tubular outer casing 108 that defines an annular inlet 110. Outer casing 108 encases, in serial flow relationship, a compressor section 112 and a turbine section 114. Compressor section 112 includes, in serial flow relationship, a low pressure (LP) compressor, or booster, 116, a high pressure (HP) compressor 118, and a combustion section 120. Turbine section 114 includes, in serial flow relationship, a high pressure (HP) turbine 122, a low pressure (LP) turbine 124, and a jet exhaust nozzle section 126. A high pressure (HP) shaft, or spool, 128 drivingly connects HP turbine 122 to HP compressor 118. A low pressure (LP) shaft, or spool, 130 drivingly connects LP turbine 124 to LP compressor 116. Compressor section, combustion section 120, turbine section, and nozzle section 126 together define a core air flowpath 132.

In the exemplary embodiment, fan section 104 includes a fan 134 having a plurality of fan blades 136 coupled to a disk 138 in a spaced apart relationship. Fan blades 136 extend radially outwardly from disk 138. Fan blades 136 and disk 138 are together rotatable about longitudinal axis 102 by LP shaft 130 across a power gear box 142.

Disk 138 is coupled with a forward fan shaft bearing 144. Additionally, fan section 104 includes an annular fan casing, or outer nacelle, 146 that at least partially surrounds fan 134 and/or at least a portion of core engine 106. In the exemplary embodiment, annular fan casing 146 is configured to be supported relative to core engine 106 by a plurality of circumferentially-spaced outlet guide vanes 148. Additionally, a downstream section 150 of annular fan casing 146 may extend over an outer portion of core engine 106 so as to define a bypass airflow passage 152 therebetween.

During operation of gas turbine engine 100, a volume of air 154 enters gas turbine engine 100 through an associated inlet 156 of annular fan casing 146 and/or fan section 104. As volume of air 154 passes across fan blades 136, a first portion 158 of volume of air 154 is directed or routed into bypass airflow passage 152 and a second portion 160 of volume of air 154 is directed or routed into core air flowpath 132, or more specifically into LP compressor 116. A ratio between first portion 158 and second portion 160 is commonly referred to as a bypass ratio. The pressure of second portion 160 is then increased as it is routed through high pressure (HP) compressor 118 and into combustion section 120, where it is mixed with fuel and burned to provide combustion gases 162.

Combustion gases 162 are routed through HP turbine 122 where a portion of thermal and/or kinetic energy from combustion gases 162 is extracted via sequential stages of HP turbine stator vanes 164 that are coupled to outer casing 108 and a plurality of HP turbine rotor blades 166 that are coupled to HP shaft 128, thus causing HP shaft 128 to rotate, which then drives a rotation of HP compressor 118. Combustion gases 162 are then routed through LP turbine 124 where a second portion of thermal and kinetic energy is extracted from combustion gases 162 via sequential stages of a plurality of LP turbine stator vanes 168 that are coupled to outer casing 108, and a plurality of LP turbine rotor blades 170 that are coupled to LP shaft 130 and which drive a rotation of LP shaft 130 and LP compressor 116 and/or rotation of variable pitch fan 134.

Combustion gases 162 are subsequently routed through jet exhaust nozzle section 126 of core engine 106 to provide propulsive thrust. Simultaneously, the pressure of first portion 158 is substantially increased as first portion 158 is routed through bypass airflow passage 152 before it is exhausted from a fan nozzle exhaust section 172 of gas turbine engine 100, also providing propulsive thrust. HP turbine 122, LP turbine 124, and jet exhaust nozzle section 126 at least partially define a hot gas path 174 for routing combustion gases 162 through core engine 106.

Gas turbine engine 100 is depicted in FIG. 1 by way of example only, and that in other exemplary embodiments, gas turbine engine 100 may have any other suitable configuration including for example, a turboprop engine or a military purpose jet engine. For example, according to one exemplary embodiment, gas turbine engine 100 includes a front frame assembly 176 upstream of fan section 104. Front frame assembly 176 includes a substantially cylindrical outer casing 178 and a hub ring 180 disposed around forward fan shaft bearing 144. Cylindrical outer casing 178 and cylindrical hub ring 180 are connected by a plurality of circumferentially-spaced struts 182. Hub ring 180 can be cylindrical in shape or generally conical, and is covered in the upstream direction by a hub 184 that is aerodynamically contoured to facilitate airflow, i.e., volume of air 154, through struts 182 and fan blades 136.

Figure 2:
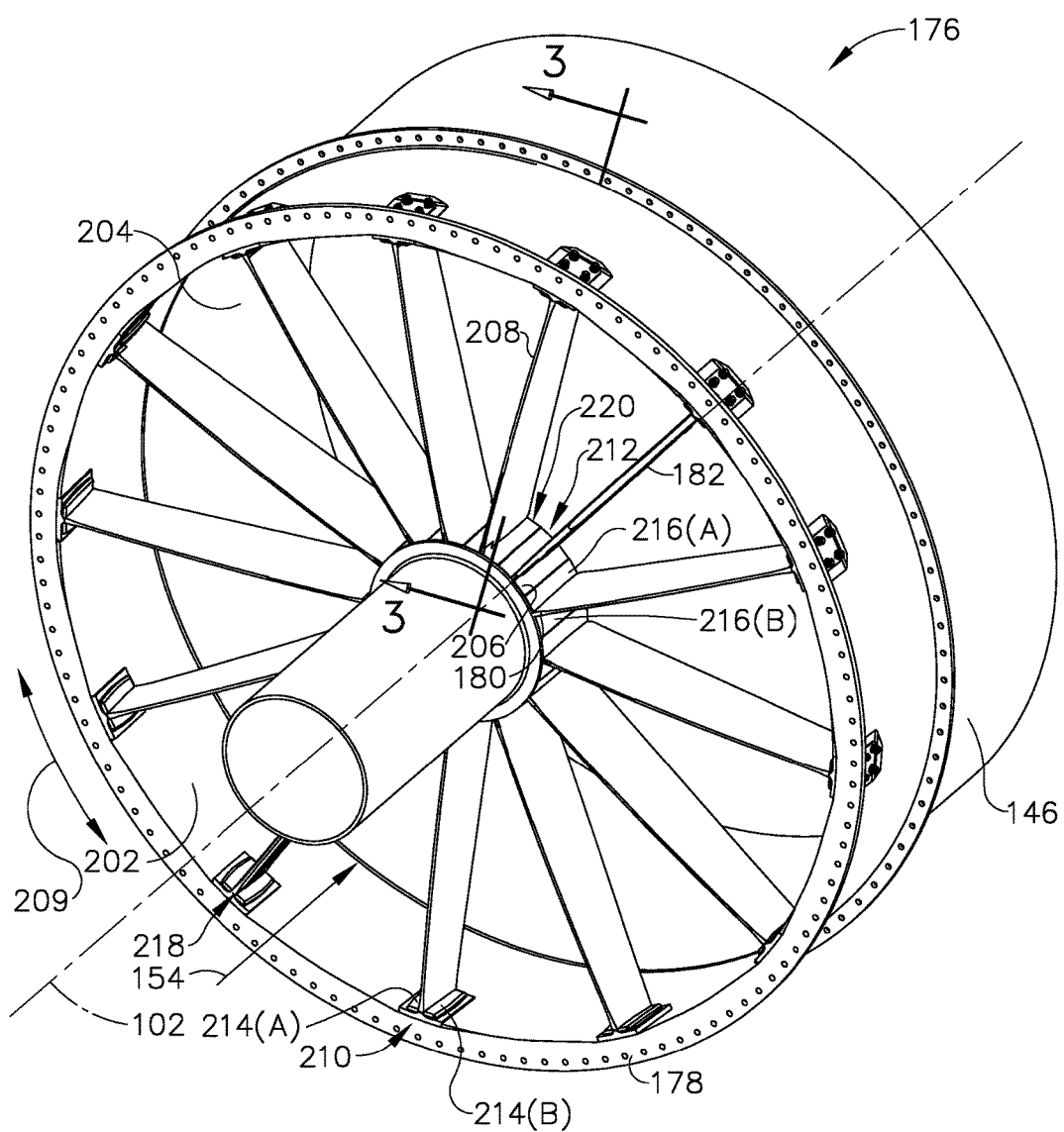
FIG. 2 is a perspective view of an attachment system for a front frame assembly in accordance with an exemplary embodiment of the present disclosure, which can be utilized with the gas turbine engine depicted in FIG. 1.

FIG. 2 is a perspective view of an attachment system for front frame assembly 176, shown in FIG. 1. Front frame assembly 176 can be utilized with gas turbine engine 100 depicted in FIG. 1, as well as other turbine engines including a fan assembly within an engine casing. The use of same reference symbols in different drawings indicates similar or identical exemplary elements for purposes of illustration.

Referring to FIG. 2, according to an exemplary embodiment, cylindrical outer casing 178 includes an inner casing surface 202 that radially faces the flowpath of air volume 154. Inner casing surface 202 smoothly and aerodynamically meets with an interior surface 204 of annular fan casing 146. Hub ring 180 is disposed coaxially within cylindrical outer casing 178 along longitudinal axis 102, and includes an outer hub surface 206 that faces radially outward toward opposing inner casing surface 202. In an exemplary embodiment, hub ring 180 is substantially cylindrical. Alternatively, hub ring 180 is conically-shaped, having outer hub surface 206 narrower in the forward axial direction and wider in the aft axial direction.

Figure 3:
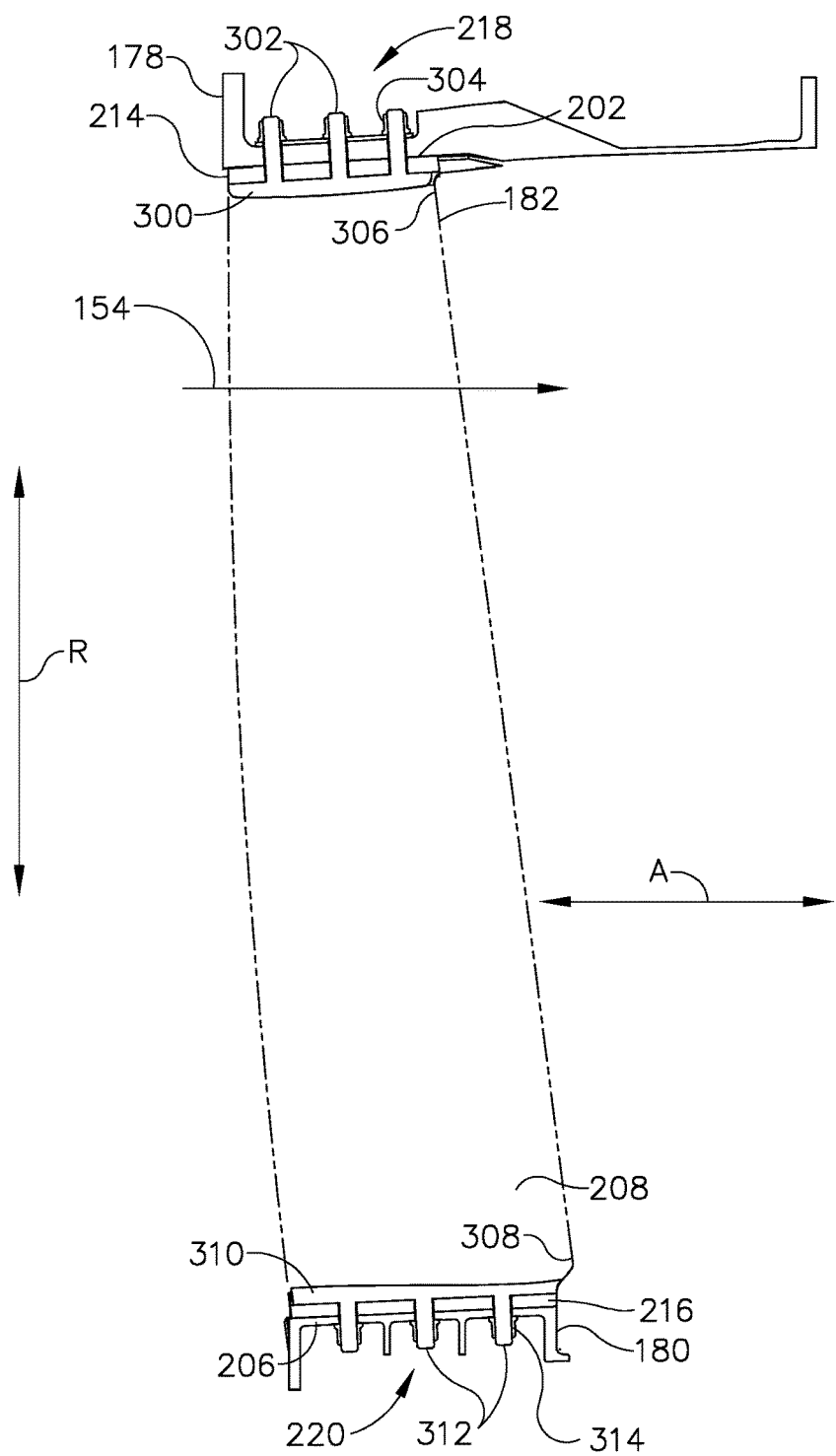
FIG. 3 is a cross-sectional view of the front frame assembly taken along line 3-3 of FIG. 2.

In the exemplary embodiment, struts 182 are each a unitary construction including an airfoil portion 208, an outer T-flange 210 coupled with inner casing surface 202, and an inner T-flange 212 coupled with outer hub surface 206. Airfoil portions 208 are oriented axially in the direction of the flow of air volume 154, and connect individual ones of outer T-flanges 210 with respective corresponding ones of inner T-flanges 212, as shown in FIG. 3. Referring back to FIG. 2, outer T-flange 210 includes a pair of outer flange portions 214(A), 214(B) that extend away from airfoil portion 208 in a circumferential direction 209 along inner casing surface 202. Similarly, inner T-flange 212 includes a pair of inner flange portions 216(A), 216(B) that oppose one another about airfoil portion 208 and extend away from airfoil portion 208 in circumferential direction 209 along outer hub surface 206.

Figure 4:
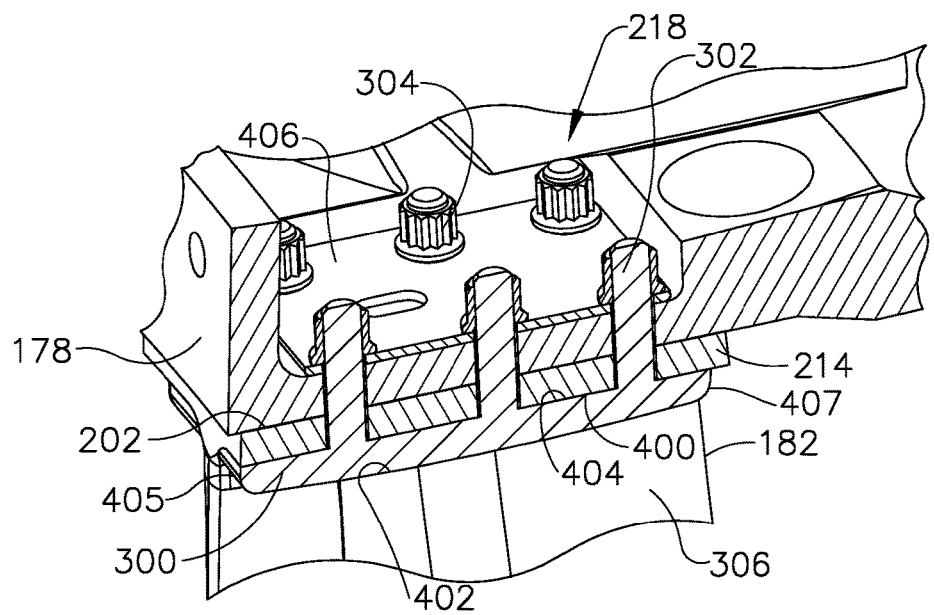
FIG. 4 is a partial perspective view of the outer doubler attachment system shown in FIG. 3.
Figure 5:
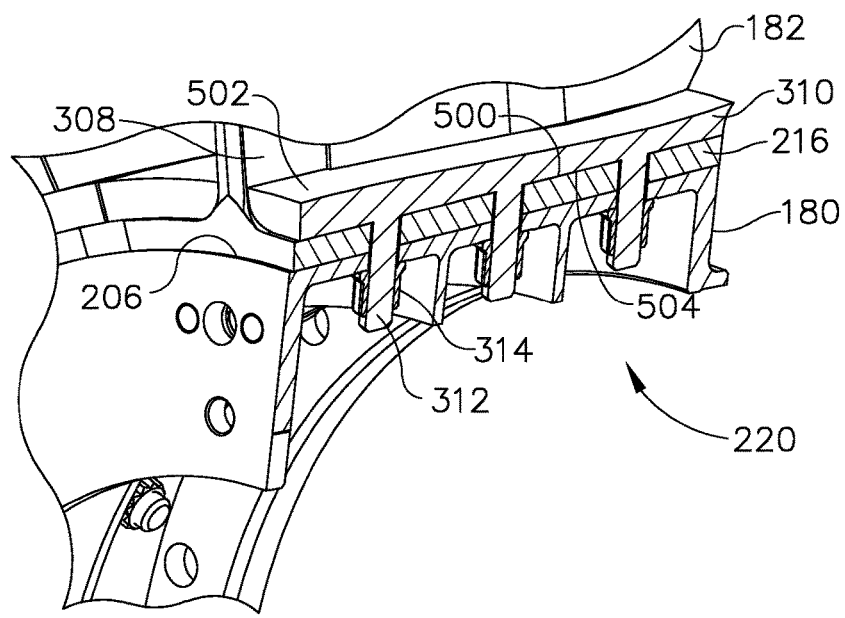
FIG. 5 is a partial perspective view of the inner doubler attachment system shown in FIG. 3.

In an exemplary embodiment, outer flange portions 214 are concavely shaped with respect to airfoil portion 208 in order to closely match the contour of inner casing surface 202, as shown in FIG. 4. Similarly, inner flange portions 216 are convexly shaped with respect to airfoil portion 208 in order to closely match the contour of outer hub surface 206, as shown in FIG. 5. By closely matching the respective contours of cylindrical outer casing 178 and hub ring 180, outer flange portions 214 and inner flange portions 216 effectively function as doubler plates for the material thicknesses of cylindrical outer casing 178 and hub ring 180, respectively, when flange portions 214, 216 are securely attached thereto.

The doubler plate functionality of flanges 214, 216 strengthens the material of cylindrical outer casing 178 and hub ring 180 against potential deflection, tearing, or buckling that may be experienced by significant load stresses on front frame assembly 176, such as blade out condition. The secure fastening of flange portions 214, 216 to cylindrical outer casing 178 and hub ring 180, respectively, effectively increases material thickness of cylindrical outer casing 178 and hub ring 180, which in turn significantly increases the shear capacity of the respective fan frame assembly components against load stresses. In an exemplary embodiment, cylindrical outer casing 178, hub ring 180, and struts 182 are formed of a composite material. Alternatively, cylindrical outer casing 178, hub ring 180, and struts 182 are formed of fabricated steel, titanium, or a nickel-chromium-based super alloy.

In the exemplary embodiment, the doubler plate functionality is further enhanced by implementing an outer doubler assembly 218 to secure each outer T-flange 210 to cylindrical outer casing 178, and an inner doubler assembly 220 to secure each inner T-flange 212 to hub ring 180. The construction of outer doubler assembly 218 and inner doubler assembly 220 is explained further below with respect to FIGS. 3-7.

FIG. 3 is a cross-sectional view of front frame assembly 176 taken along line 3-3 of FIG. 2. In the exemplary embodiment illustrated in FIG. 3, outer doubler assembly 218 includes an outer doubler plate 300, a plurality of outer doubler bolts 302, and a plurality of threaded locknuts 304. Outer doubler assembly 218 is disposed at a first, outer end 306 of airfoil portion 208 of strut 182, and fixedly secures outer flange portion 214 to inner casing surface 202 when threaded locknuts 304 are secured to radially extending threaded portions (not shown) of respective outer doubler bolts 302.

In a similar construction, inner doubler assembly 220 is disposed at a second, inner end 308 of airfoil portion 208. Inner doubler assembly 220 includes an inner doubler plate 310, a plurality of inner doubler bolts 312, and a plurality of threaded locknuts 314. Inner doubler plate 310 is similar in construction and function to outer doubler plate 300, except for its overall contour, as shown in FIGS. 4-5, discussed further below.

FIG. 4 is a partial perspective view illustrating the attachment system of outer doubler assembly 218, shown in FIGS. 2-3. As shown in FIG. 4, outer doubler plate 300 includes a first radial surface 400 and a second opposing radial surface 402, respectively. First radial surface 400 is configured to integrally mate with a facing surface 404 of outer flange portion 214. In an exemplary embodiment, second opposing radial surface 402 is configured to generally follow the contour of cylindrical outer casing 178, which curves in the axial direction of the exemplary embodiment, and includes a rounded leading edge 405 and/or a rounded trailing edge 407 to facilitate aerodynamic airflow through front frame assembly 176.

In an alternative embodiment, outer doubler assembly 218 further includes a washer plate 406 disposed along cylindrical outer casing 178 opposite outer doubler plate 300 and outer flange portion 214, and between cylindrical outer casing 178 and threaded locknuts 304. Washer plate 406 is constructed, for example, of fabricated steel, titanium, or a nickel-chromium-based super alloy. Utilization of washer plate 406 is useful for enhancing the doubler function of outer doubler assembly 218 when cylindrical outer casing 178 is, for example, constructed of a composite material.

FIG. 5 is a partial perspective view illustrating the attachment system of inner doubler assembly 220 shown in FIGS. 2-3. As shown in FIG. 5, inner doubler plate 310 includes a first radial surface and a second opposing radial surface 500, 502, respectively. First radial surface 500 is configured to integrally mate with a facing surface 504 of inner flange portion 216. In an exemplary embodiment, second opposing radial surface 502 is configured to generally follow the contour of hub ring 180, which also curves in the axial direction of the exemplary embodiment. The construction of doubler assemblies 218, 220 is described further below with respect to FIGS. 6-7.

Figure 6:
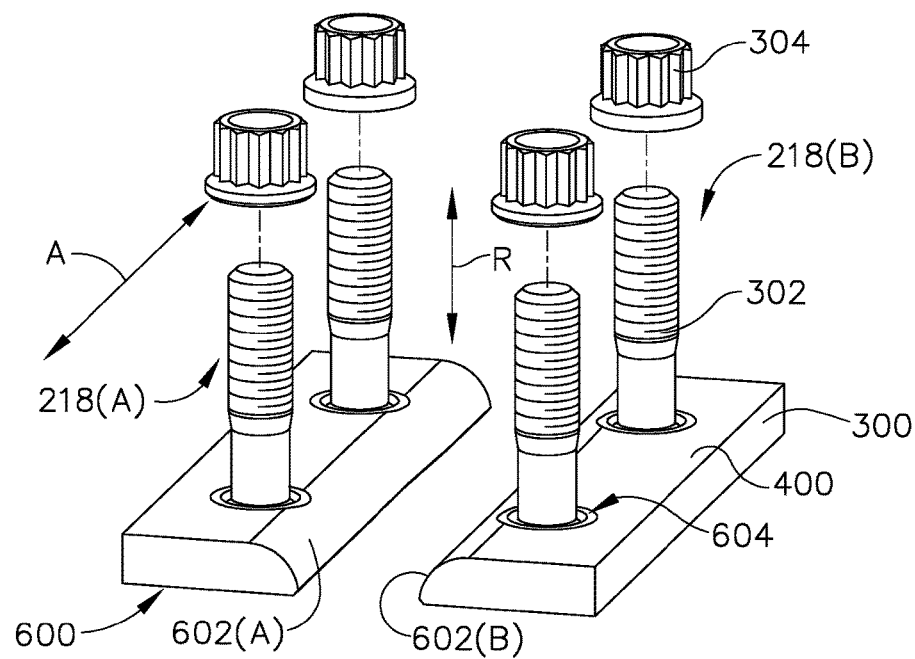
FIG. 6 is a perspective view of the outer doubler attachment system pair shown in FIG. 4.

FIG. 6 is a perspective view illustrating an outer doubler attachment system pair 600. Outer doubler attachment system pair 600 includes two individual outer doubler assemblies 218(A), 218(B), shown in FIG. 4. In various embodiments, individual outer doubler assemblies 218(A), 218(B) are substantially identical to one another in function and construction, except that individual outer doubler assembly 218(A) is a mirror image of individual outer doubler assembly 218(B) on opposing blade surfaces of strut 182 (not shown in FIG. 6). In some embodiments, if strut 182 is cambered, doubler assemblies could have different shapes to follow a cambered airfoil shape. In an exemplary embodiment, individual outer doubler assemblies 218(A), 218(B)

each include a rounded edge 602(A), 602(B), respectively, which are shaped to closely mate with corresponding curved joints (see element 702, shown in FIG. 7, not shown in FIG. 6) of outer flange portions 214.

Individual outer doubler assemblies 218(A), 218(B) each further include at least two outer doubler bolts 302 spaced apart in axial direction A, to facilitate easy insertion of the entire individual outer doubler assembly 218 through corresponding openings (see elements 704, 706, respectively, shown in FIG. 7, not shown in FIG. 6) in outer flange portion 214 and cylindrical outer casing 178. Each of the outer doubler bolts 302 extends radially from first radial surface 400 toward outer flange portion 214 and cylindrical outer casing 178, shown in FIG. 7. Each outer doubler bolt 302 is fixedly attached to outer doubler plate 300 at first radial surface 400 by a doubler joint 604.

Figure 7:
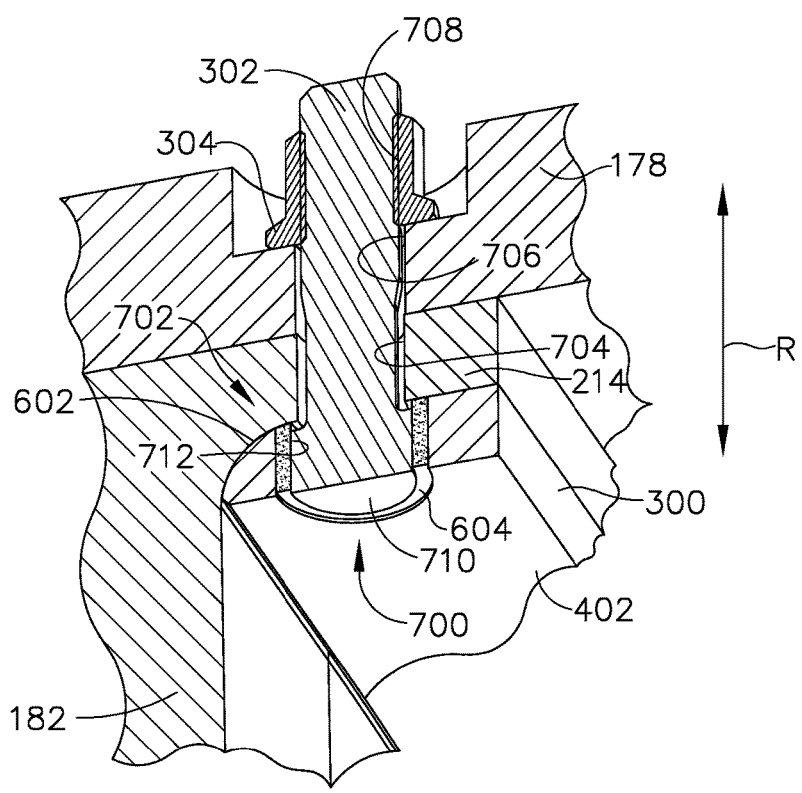
FIG. 7 is a partial perspective view illustrating the assembly of the doubler attachment system shown in FIG. 6.

FIG. 7 is a partial perspective view illustrating an exemplary assembly 700 of individual outer doubler assembly 218, shown in FIGS. 3-4 and 6. Assembly 700 includes outer doubler plate 300, outer doubler bolt 302 fixedly attached to outer doubler plate 300 by doubler joint 604, and outer threaded locknut 304. Doubler plate 300 includes rounded edge 602 shaped to closely mate with corresponding curved joint 702 of outer flange portion 214. That is, rounded edge 602 forms a radial surface that mates with a corresponding radial joint formed by curved joint 702.

In operation, assembly 700 is configured so that outer doubler bolt 302 extends radially from outer doubler plate 300 through an opening 704 in outer flange portion 214, and continuing through a corresponding opening 706 in cylindrical outer casing 178, beyond which threaded locknut 304 fixedly secures together assembly 700 by threaded attachment (not shown) to a threaded terminal end 708 of outer doubler bolt 302. Opposing joint terminal end 710 of outer doubler bolt 302 is configured to align with second opposing radial surface 402 of outer doubler plate 300 to form a unitary smooth contour along the air flowpath through front frame assembly 176.

In an exemplary embodiment, both outer doubler plate 300 and outer doubler bolt 302 are formed of a nickel-chromium-based super alloy material, and doubler joint 604 is formed by, for example, but not limited to, an electronic beam weld process that fixedly secures opposing joint terminal end 710 to an opening 712 in outer doubler plate 300 throughout an entire thickness (not numbered) of doubler plate 300. In an alternative embodiment, outer doubler plate 300 and outer doubler bolt 302 are formed of a unitary construction.

Exemplary embodiments of attachment systems for struts on a front fan casing for gas turbine engines are described above in detail. The attachment systems, and methods of operating such systems and component devices are not limited to the specific embodiments described herein, but rather, components of the systems and/or steps of the methods may be utilized independently and separately from other components and/or steps described herein. For example, the methods may also be used in combination with other systems where radial struts couple inner and outer casings together, and are not limited to practice with only the systems and methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A doubler attachment system for fixedly coupling a strut to an engine casing, the strut including at least one flanged end configured to mate with the engine casing, the system comprising:
    a doubler plate comprising a first radial surface and a second opposing radial surface, said first radial surface configured to mate with and conform to a contour of the at least one flanged end of the strut; and
    at least two bolts fixedly attached to said doubler plate and extending radially away from said first radial surface, wherein said at least two bolts are fixedly attached at said first radial surface of said doubler plate by a weld joint.

2. The doubler attachment system as claimed in claim 1, wherein said weld joint is formed using electronic beam welding.

3. The doubler attachment system as claimed in claim 1, wherein said doubler plate and said at least two bolts comprise a nickel-chromium-based super alloy.

4. The doubler attachment system as claimed in claim 1, wherein said second opposing radial surface is curved to conform to an airflow path within the engine casing.

5. The doubler attachment system as claimed in claim 4, wherein said at least two bolts form a unitary smooth contour at said second opposing radial surface.

6. The doubler attachment system as claimed in claim 1, wherein the at least two bolts each include a threaded terminal end, the doubler attachment system further comprising:
    a unitary washer plate coupled with said at least two bolts along the engine casing opposite the at least one flanged end of the strut; and
    at least two threaded nuts configured to fixedly secure to said threaded terminal ends of the at least two bolts, the at least two threaded nuts further configured to fixedly couple the at least one flanged end of the strut to the engine casing when secured to the respective threaded terminal ends.

7. A front frame assembly for a gas turbine engine comprising:
    a generally cylindrical outer casing having an inner casing surface radially facing an air flowpath through the gas turbine engine;
    a hub ring disposed coaxially within said generally cylindrical outer casing, said hub ring having an outer hub surface radially opposed to said inner casing surface; and
    a plurality of strut assemblies circumferentially disposed about said hub ring, said plurality of strut assemblies configured to fixedly couple said outer hub surface with said inner casing surface, each said strut assembly of said plurality of strut assemblies comprising:

an airfoil portion oriented in the axial direction of the air flowpath and including first and second opposing blade ends;

an outer T flange disposed at said first opposing blade end, said outer T flange comprising two opposing outer flanges extending away from said airfoil portion and configured to couple with said inner casing surface; and an outer doubler assembly pair configured to fixedly secure said two opposing outer flanges, respectively, to said inner casing surface, each said outer doubler assembly of said outer doubler assembly pair comprising an outer doubler plate and at least two bolts fixedly attached at a first surface of said outer doubler plate, wherein said at least two bolts are fixedly attached at said first surface of said outer doubler plate by a weld joint.

8. The front frame assembly as claimed in claim 7, wherein said airfoil portion and said outer T flange comprise a unitary construction.

9. The front frame assembly as claimed in claim 8, wherein said airfoil portion and said outer T flange comprise one of a fabricated steel construction, a nickel chromium based super alloy, titanium, and a composite material.

10. The front frame assembly as claimed in claim 7, wherein said cylindrical outer casing and said hub ring comprise one of a fabricated steel construction, a nickel chromium based super alloy, titanium, and a composite material.

11. The front frame assembly as claimed in claim 7, wherein said outer doubler plate comprises a rounded blade facing edge extending in the axial direction, said rounded blade facing edge configured to conform to a curved portion of said outer T flange.

12. The front frame assembly as claimed in claim 7, wherein said at least two bolts comprise a nickel chromium based super alloy.

13. The front frame assembly as claimed in claim 7, wherein said outer doubler plate comprises a nickel chromium based super alloy.

14. The front frame assembly as claimed in claim 7, wherein said at least two bolts form a unitary smooth contour at a second surface of said outer doubler plate opposed to said first surface.

15. The front frame assembly as claimed in claim 14, wherein said unitary smooth contour of said second surface is substantially parallel with a contour of said inner casing surface.

16. The front frame assembly as claimed in claim 7, wherein said cylindrical outer casing has an outer casing surface opposed to said inner casing surface in the radial direction, and wherein each said strut assembly further comprises a unitary washer plate disposed along said outer casing surface and configured to one of the at least two bolts of said outer doubler plate assembly pair.

17. The front frame assembly as claimed in claim 7, wherein each said strut assembly further comprises:

an inner T flange disposed at said second opposing blade end, said inner T flange comprising two opposing inner flanges extending away from said airfoil portion and configured to couple with said outer hub surface; and an inner doubler assembly pair configured to fixedly secure said two opposing inner flanges, respectively, to said outer hub surface, each said inner doubler assembly of said inner doubler assembly pair comprising an inner doubler plate and at least two bolts fixedly attached at a first surface of said inner doubler plate.

18. A gas turbine engine including a core engine and a fan assembly disposed upstream of the core engine and including a forward fan shaft bearing, the gas turbine engine comprising:

a front frame assembly disposed upstream of the fan assembly, said front frame assembly comprising:

a generally cylindrical outer casing disposed coaxially with the forward fan shaft bearing;

a hub ring disposed about the forward fan shaft bearing and coaxially within said cylindrical outer casing;

a plurality of struts circumferentially disposed about said hub ring and configured to fixedly couple said cylindrical outer casing with said hub ring, each said strut of said plurality of struts comprising an outer T flange configured to mate with said cylindrical outer casing and an inner T flange configured to mate with said hub ring; and a plurality of doubler assemblies configured to fixedly secure each flanged portion of said outer and inner T flanges to said cylindrical outer casing and said hub ring, respectively, each said doubler assembly of said plurality of doubler assemblies comprising a doubler plate comprising a first radial surface and a second opposing radial surface and at least two bolts fixedly attached at said first radial surface and extending radially away from said first radial surface.

* * * * *